(12) United States Patent
Pomme

(10) Patent No.: US 6,425,262 B1
(45) Date of Patent: Jul. 30, 2002

(54) MOTOR VEHICLE AIR CONDITIONING CIRCUIT PROVIDED WITH PRE-EXPANSION DEVICE

(75) Inventor: Vincent Pomme, Montigny le Bretonneux (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/486,132

(22) PCT Filed: Jun. 23, 1999

(86) PCT No.: PCT/FR99/01514

§ 371 (c)(1),
(2), (4) Date: Feb. 23, 2000

(87) PCT Pub. No.: WO99/67101

PCT Pub. Date: Dec. 29, 1999

(30) Foreign Application Priority Data

Jun. 23, 1998 (FR) .............................................. 98 07929

(51) Int. Cl.[7] .............................................. F25B 43/00
(52) U.S. Cl. .......................................... 62/511; 62/509
(58) Field of Search .......................... 62/509, 527, 528, 62/511; 138/44

(56) References Cited

U.S. PATENT DOCUMENTS

| | | | |
|---|---|---|---|
| 4,324,112 A | | 4/1982 | Fujiwara et al. |
| 4,742,694 A | | 5/1988 | Yamanaka et al. |
| 5,036,680 A | * | 8/1991 | Fujiwara et al. ............... 62/509 |
| 5,085,058 A | * | 2/1992 | Aaron et al. ................... 62/511 |
| 5,592,830 A | * | 1/1997 | Baba et al. .................... 62/509 |

* cited by examiner

Primary Examiner—William E. Tapolcai
Assistant Examiner—Mohammad M. Ali
(74) Attorney, Agent, or Firm—Morgan & FInnegan, LLP

(57) ABSTRACT

The invention is directed to an air conditioning unit having a refrigerating fluid loop comprising a compressor, a condenser, a liquid/gas separating reservoir, an expansion device, an evaporator and a pre-expansion device, inserted between the condenser and the reservoir, which is capable of producing a pressure drop ranging between 1.5 and 14 bars to reduce the fluid pressure down to its vapor saturating pressure. The reservoir can also contain a variable amount of liquid to compensate the fluid losses in the loop by maintaining the sub-cooling temperature constant in the condenser and consequently the heating capacity capable of being absorbed by the evaporator.

13 Claims, 2 Drawing Sheets

MOTOR VEHICLE AIR CONDITIONING CIRCUIT PROVIDED WITH PRE-EXPANSION DEVICE

BACKGROUND OF THE INVENTION

The invention relates to a liquid coolant loop, in particular for an air conditioning installation for the passenger compartment of a vehicle.

JP-A-95 81383 describes such a loop comprising a compressor capable of raising the pressure of the coolant in the gaseous state, a condenser capable of condensing the coolant compressed by the compressor and of undercooling it to the liquid state, a preliminary pressure reduction device capable of lowering the pressure of the coolant coming out of the vessel and an evaporator capable of making the coolant coming from the pressure reducing valve pass from the liquid state to the gaseous state before its return to the compressor.

FIG. 1 is a diagram representing a thermodynamic cycle described by the liquid coolant in an air conditioning loop, traced in a system of enthalpy/pressure coordinates. In this system, a bell-shaped curve L envelops a zone of coexistence between liquid and gas, whereas the coolant is entirely in the liquid state to the left of the left-hand side of the curve and entirely in the gaseous state to the right of the right-hand side.

The cycle substantially has the shape of a rectangular trapezium with horizonal bases. From a point A situated in the gaseous zone, the compressor conveys the coolant in the gaseous state to a point B corresponding to a higher enthalpy and pressure than at point A. In the condenser, the coolant passes through a horizontal segment from point B to a point E situated in the liquid zone, which segment passes through the right-hand and left-hand sides of the curve L at points C and D respectively. Segments BC, CD and DE correspond respectively to a desuperheating of the gaseous coolant, to the condensation and an under-cooling of the coolant in the liquid state. At the entrance of the evaporator, the coolant is at a point G situated in the liquid/gas zone, corresponding to the same enthalpy value as point E and to the same pressure value as point A. In the evaporator, the coolant is returned to point A by passing through, at H, the right-hand side of the curve L.

In conventional liquid coolant loops, the coolant passes through the separating vessel at point E of the thermodynamic cycle, and passes through segment EG in the pressure reducing valve. As point E is situated in the liquid zone, the vessel is then completely filled with liquid and the quantity of coolant which it contains cannot vary. When the total mass of the liquid coolant contained in the loop falls, especially by virtue of leaks in the circuit, this reduction is performed in particular at the expense of the condenser, the undercooling capacity of which is thus reduced, which has the effect of raising the enthalpy level of the coolant at the outlet of the condenser and at the inlet of the evaporator and consequently of reducing the useful heat absorbed by the coolant in the evaporator.

One solution to this problem lies in departing from the conventional architecture by positioning the separating vessel between a condensation part and an undercooling part of the condenser, so that the thermodynamic state of the coolant in the vessel corresponds to point D of the cycle, situated on the saturation curve, which allows the vessel to contain a quantity of coolant that can vary as a function of the total mass of coolant in the circuit.

BRIEF SUMMARY OF THE INVENTION

According to the invention, this same result may be obtained in a loop such as that defined in the introduction, by positioning between the condenser and the vessel a preliminary pressure reduction device which is capable of producing a pressure loss of between 1.5 and 14 bars so as to bring the pressure of the coolant back up to its saturated vapour pressure.

The preliminary pressure reduction device conveys the fluid from the thermodynamic state corresponding to the point E to that corresponding to the point F, situated again on the saturation curve, in which state the coolant continued in the separating vessel is consequently situated. The pressure reducing valve then conveys the coolant from point F to point G.

It is also known from JP-A-93223365 to place a device that produces a pressure loss between the condenser and the vessel. However, from this document it does not follow that this pressure loss brings the pressure of the coolant back again to its saturated vapour pressure. Furthermore, the only values disclosed for the loss of pressure are 0.5 and 1.0 kg/cm$^2$, the latter value bringing about a substantial loss in cooling capacity of the loop.

Complementary or alternative optional characteristics of the invention are given below:

The preliminary pressure reduction device is capable of producing a pressure loss of between 4 and 10 bars.

The preliminary pressure reduction device comprises a constriction defining a minimum passage section of between 0.2 and 7 mm$^2$ approximately in a pipe through which the entire flow of coolant leaving the condenser passes.

The passage section substantially retains its minimum value over a length of between 0.1 and 5 mm.

The minimum passage section does not exceed 50% of the passage section of the pipe upstream and/or downstream from the constriction.

The passage section reduces progressively in an initial region of the constriction, substantially retains its minimum value in an intermediate region and progressively increases in a final region.

The constriction is formed by an insert introduced into a substantially cylindrical pipe.

The constriction is formed by a thickening of the wall of a substantially cylindrical pipe.

The constricted passage is adjacent to the cylindrical wall.

The constricted passage is substantially centred in relation to the cylindrical wall.

The constriction is formed by a washer lock-beaded into the pipe.

The preliminary pressure reduction device is housed in an outlet pipe mounted on a manifold of the condenser.

The said outlet pipe is contained in the separating vessel and discharges into a gas collection space thereof.

BRIEF DESCRIPTION OF THE DRAWINGS

The characteristics and advantages of the invention will be shown in further detail in the following description, with reference to the attached drawings, on which.

DETAILED DESCRIPTION OF THE INVENTION

Figure 3:
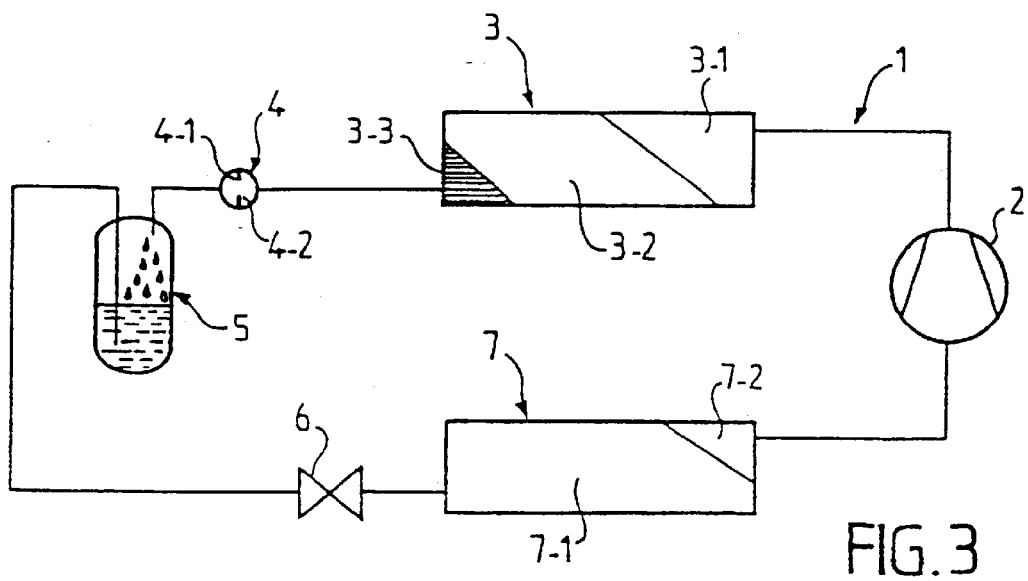
FIG. 3 is a diagram of a liquid coolant loop according to the invention.

The loop 1 shown diagrammatically on FIG. 3 comprises a compressor 2, a condenser 3, a preliminary pressure reduction device 4, a separating vessel or "cylinder" 5, a pressure reducing valve 6 and an evaporator 7 through which the liquid coolant passes in this order. The lower part of the vessel 5 is filled with coolant in the liquid state, the residual gas which penetrates into the vessel remains above the liquid level and only coolant in the liquid state is taken off beneath this level to be sent towards the pressure reducing valve 6. Diagrammatically indicated in the condenser 3 are a desuperheating portion 3-1 where the coolant in the gaseous state coming from the compressor is cooled to a liquid-gas equilibrium temperature, a condensation portion 3-2 where the coolant is condensed to the equilibrium temperature, and an undercooling portion 3-3 where the coolant in the liquid state is cooled beneath the equilibrium temperature. Similarly, the evaporator comprises a vaporisation portion 7-1 and a superheating portion 7-2.

Figure 1:
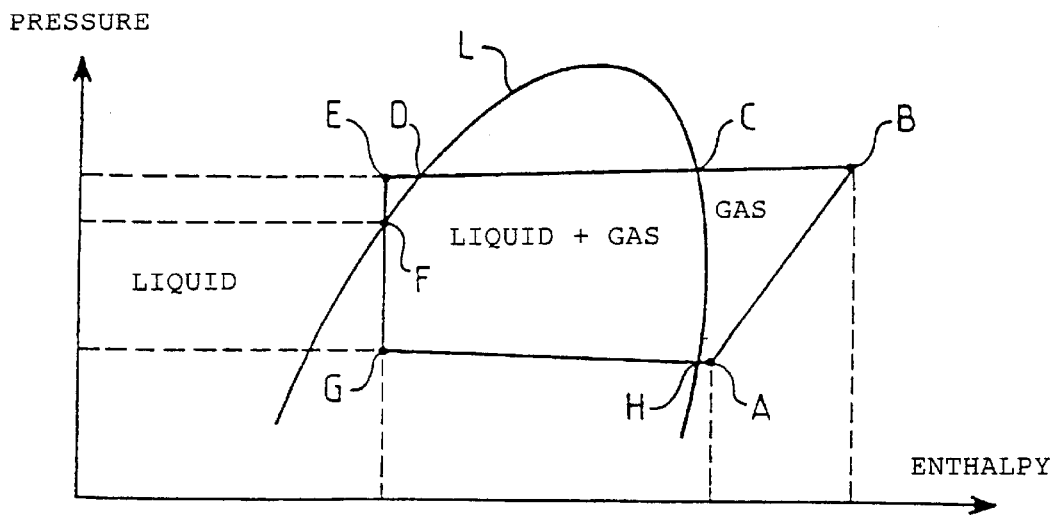
FIG. 1 is a thermodynamic diagram which has already been commented on above.
Figure 2:
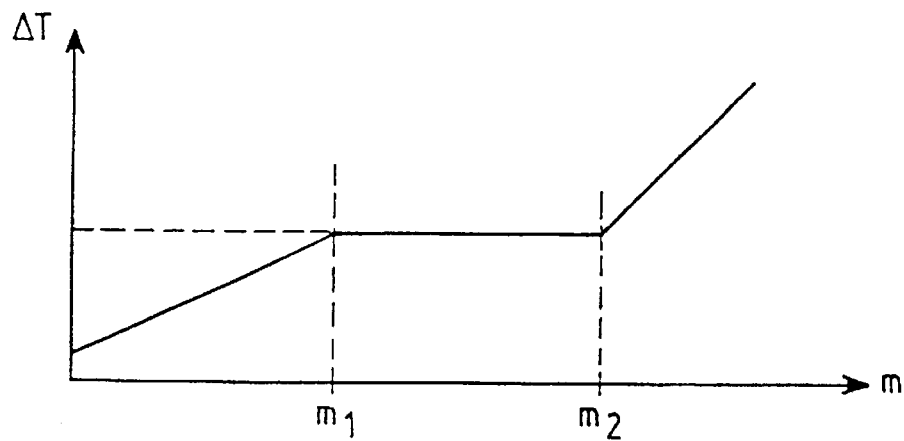
FIG. 2 is a diagram showing the variation of the degree of undercooling produced by the condenser as a function of the mass of coolant in a loop according to the invention.

FIG. 2 provides a curve that is representative of the variation of the difference ΔT between the liquid/gas equilibrium temperature in the condenser (condensation temperature) and the temperature of the coolant at the outlet of the condenser, after undercooling, as a function of the mass m of fluid contained in a loop according to the invention. This curve is formed of a first portion rising to a value $m_1$, a second horizontal portion from $m_1$ to $m_2$ and a third portion rising to beyond $m_2$. The plateau is obtained thanks to the variation in the quantity of coolant contained in the vessel 5, the values $m_1$ and $m_2$ corresponding respectively to the minimum and maximum liquid levels therein. The degree of undercooling, and consequently the performances of the loop, remain substantially constant until the leakages return the mass of coolant to $m_1$. The initial mass of coolant is preferably chosen in the vicinity of $m_2$ so that the stable operating time is as long as possible. The length of the plateau is itself a function of the liquid-gas separation capacity and of the volume of the vessel.

For the conventional loop mentioned above, in which the thermodynamic state of the fluid in the separating vessel corresponds to point E of the cycle, the plateau of the curve of FIG. 2 does not exist and the degree of undercooling varies continuously with the quantity of coolant.

In the diagram of FIG. 3, the preliminary pressure reduction device is represented by way of example in the form of a diaphragm 4-1 disposed at right angles to the path of the coolant and having an orifice 4-2. As shown, the condenser 3, the preliminary pressure reduction device 4 and the vessel 5 may be disposed spaced apart and interconnected by connecting pipes.

Figure 4:
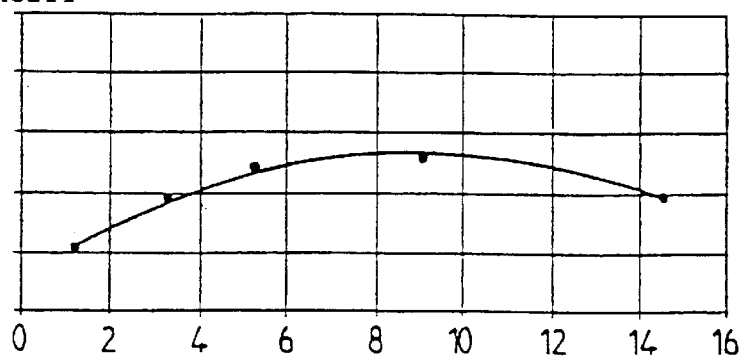
FIG. 4 is a diagram showing the variation of the refrigerating capacity of a loop according to the invention as a function of the pressure loss produced by the preliminary pressure reduction device.

The preliminary pressure reduction device, regardless of its shape and position, improves the refrigerating capacity provided by the air conditioning loop, as the curve of FIG. 4 shows, which represents the variation of this capacity as a function of the loss of pressure produced by the preliminary pressure reduction device. It is noted that the refrigerating capacity exceeds a maximum for a loss of pressure of 9 bars, an improvement being observed, in relation to the absence of the preliminary pressure reduction device, at least in the range of 1.5 to 14 bars, and more particularly in the range of 4 to 10 bars.

Figure 5:
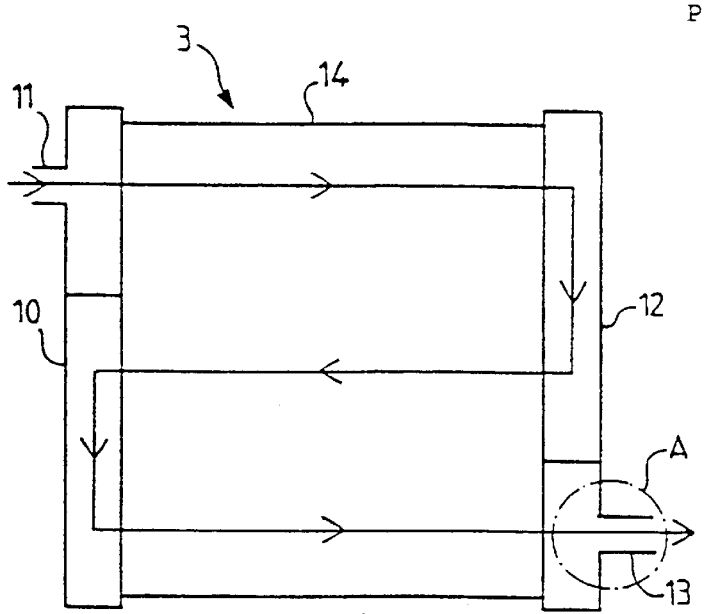
FIG. 5 is a diagrammatical representation of a condenser having an outlet manifold and an outlet pipe, either the one or the other of which may receive a preliminary pressure reduction device according to the invention.

FIG. 5 diagrammatically shows a condenser comprising an inlet manifold 10 equipped with an inlet pipe 11, an outlet manifold 12 equipped with a outlet pipe 13 and a bank of tubes 14 through which the coolant circulates between different chambers formed in the manifolds. The preliminary pressure reduction device of the invention may advantageously be housed either in the manifold 12, or in the pipe 13, in the zone A where they are connected.

Figure 6:
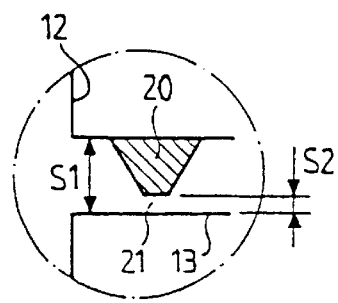
FIGS. 6 to 8 are diagrammatical representations showing different ways of producing a constriction in the outlet pipe.

FIG. 6 shows a preliminary pressure reduction device formed by an insert 20 introduced into the outlet pipe 13 and applied against the cylindrical wall thereof, over a fraction of its perimeter, leaving a constricted passage 21 adjacent to the remaining portion of the perimeter of the wall. The passage 21 has a minimum passage section S2 which does not exceed 50% of the passage section S1 of the pipe 13 upstream and downstream from the insert 20, the section S2 being advantageously being 0.2 and 7 mm² approximately. In the plane of projection, the insert 20 has a trapezoidal profile thanks to which the passage section progressively reduces in an initial region of the constriction, retains its minimum value in an intermediate region and progressively increases in a final region.

Figure 7:
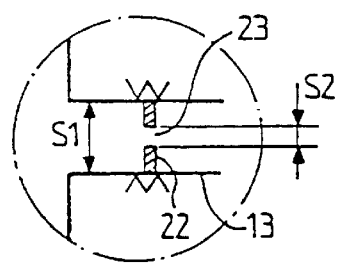

In the variant of FIG. 7, the insert 20 is replaced by a washer 22 disposed at right angles to the pipe 13 and having a central hole 23 defining a constricted passage, the passage section of which is constant here and meets the conditions mentioned with respect to the minimum passage section of the constriction 21. The length of the constriction 23, i.e. the thickness of the washer 22, is between 0.1 and 5 mm. The washer 22 may be fixed by lock beading, deforming the thin wall of the pipe 13 on either side of its thickness.

Figure 8:
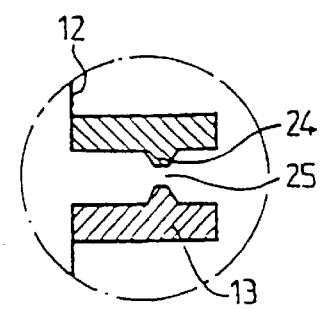

FIG. 8 shows an outlet pipe 13 having a thick wall, which for example is moulded, fixed mechanically to the manifold 12 of the condenser. The pipe 13 has an internal circumferential rib 24 which leaves a central passage of reduction section. The rib 24 has a trapezoidal profile, thanks to which the passage section of the constriction 25 varies in a similar manner to that of the constriction 21.

Figure 9:
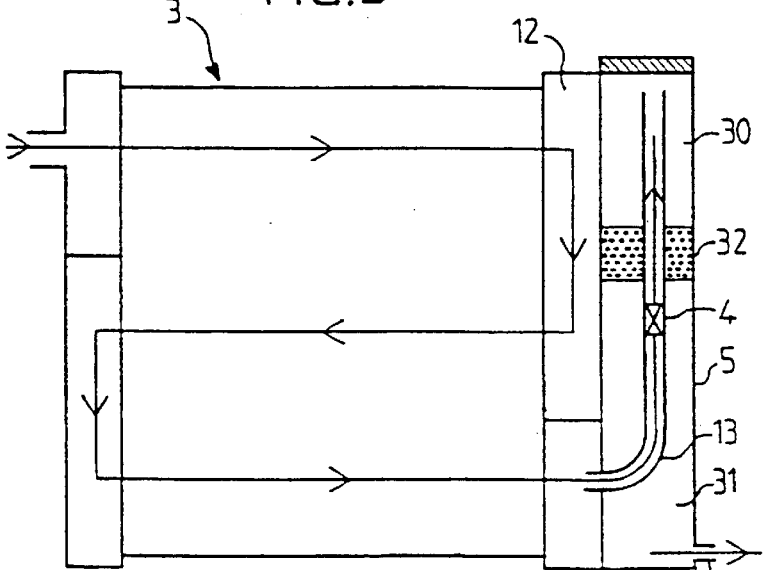
FIG. 9 is a diagrammatical representation of a single-piece sub-assembly comprising a condenser, a preliminary pressure reduction device and a separating vessel.

FIG. 9 shows a condenser 3 similar to that of FIG. 5 and a separating vessel 5 coupled to the side of the outlet manifold 12, the manifold 12 and the vessel 5 being vertically lengthened. The outlet pipe 13 is housed in the vessel 5 and curves so as to extend upwards and open into the upper portion of the vessel, in a space 30 where the residual gas leaving the condenser collects. The space 30 is separated from the lower space 31 of the vessel by a filtration zone 32 through which the pipe 13 passes. The coolant in the liquid state leaves the vessel by a lower pipe 33 communicating with the space 31. The preliminary pressure reduction device 4 is interposed on the pipe 13 and consequently housed in the vessel 5.

What is claimed is:

1. A liquid coolant loop for an air conditioning installation for the passenger compartment of a vehicle, comprising a compressor capable of raising the pressure of the coolant in the gaseous state, a condenser capable of condensing the coolant compressed by the compressor and undercooling it to the liquid state, a preliminary pressure reduction device capable of lowering the pressure of the coolant leaving the condenser, before its passage into a separating vessel capable of separating residual gas of the coolant in the liquid state coming from the condenser, a pressure reducing valve capable of lowering the pressure of the coolant leaving the vessel and an evaporator capable of making the coolant coming from the pressure reducing valve pass from the liquid state to the gaseous state before its return to the compressor, wherein the preliminary pressure reducing device is capable of producing a pressure loss of between 1.5 and 14 bars so as to bring the pressure of the coolant back to its saturated vapour pressure.

2. A loop according to claim 1, wherein the preliminary pressure reduction device is capable of producing a pressure loss of between 4 and 10 bars.

3. A loop according to claim 1, wherein the preliminary pressure reduction device comprises a constriction defining a minimum passage section of between 0.2 and 7 mm$^2$ approximately in a pipe through which the entire flow leaving the condenser passes.

4. A loop according to claim 3, wherein the passage section substantially retains a minimum value over a length of between 0.1 and 5 mm.

5. A loop according to claim 4, wherein the minimum passage section does not exceed 50% of the passage section of the pipe upstream and/or downstream from the constriction.

6. A loop according to claim 3, wherein the passage section progressively decreases in an initial region of the constriction, substantially retains its minimum value in an intermediate region and progressively increases in a final region.

7. A loop according to claim 3, wherein the constriction is formed by an insert introduced into a substantially cylindrical pipe.

8. A loop according to claim 3, wherein the constriction is formed by a thickening of a wall of a substantially cylindrical pipe.

9. A loop according to claim 7, wherein the constricted passage is adjacent to the cylindrical wall.

10. A loop according to claim 7, wherein the constricted passage is substantially centred in relation to the cylindrical wall.

11. A loop according to claim 10, wherein the constriction is formed by a washer lock-beaded into the pipe.

12. A loop according to claim 1, wherein the preliminary pressure reduction device is housed in an outlet pipe mounted on a manifold of the condenser.

13. A loop according to claim 12, wherein the outlet pipe is contained in the separating vessel and discharges into a gas collection space thereof.

* * * * *

UNITED STATES PATENT AND TRADEMARK OFFICE
CERTIFICATE OF CORRECTION

PATENT NO. : 6,425,262 B1
DATED : July 30, 2002
INVENTOR(S) : Vincent Pomme

It is certified that error appears in the above-identified patent and that said Letters Patent is hereby corrected as shown below:

<u>Title page,</u>
Item [54], please delete the entire Title, and insert -- A VEHICLE AIR CONDITIONING CIRCUIT PROVIDED WITH A PRELIMINARY PRESSURE REDUCTION DEVICE --.

Signed and Sealed this

Twelfth Day of November, 2002

*Attest:*

JAMES E. ROGAN
*Attesting Officer*     *Director of the United States Patent and Trademark Office*